(12) United States Patent
Cui et al.

(10) Patent No.: US 7,802,009 B2
(45) Date of Patent: Sep. 21, 2010

(54) AUTOMATIC REVERSE ENGINEERING OF MESSAGE FORMATS FROM NETWORK TRACES

(75) Inventors: Weidong Cui, Redmond, WA (US); Jayanthkumar Kannan, Berkeley, CA (US); Jiahe Helen Wang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 11/768,780

(22) Filed: Jun. 26, 2007

(65) Prior Publication Data

US 2009/0006645 A1    Jan. 1, 2009

(51) Int. Cl.
G06F 15/16     (2006.01)
G06F 15/173    (2006.01)

(52) U.S. Cl. .................. 709/236; 709/223; 709/224; 709/230

(58) Field of Classification Search .......... None
See application file for complete search history.

(56) References Cited

U.S. PATENT DOCUMENTS

| | | | |
|---|---|---|---|
| 6,765,881 B1 | 7/2004 | Rajakarunanayake | |
| 6,892,230 B1 | 5/2005 | Gu et al. | |
| 6,931,574 B1 * | 8/2005 | Coupal et al. | 714/39 |
| 6,982,953 B1 | 1/2006 | Swales | |
| 7,068,608 B2 | 6/2006 | Mattson et al. | |
| 7,401,326 B1 * | 7/2008 | Durham et al. | 717/139 |
| 2002/0012320 A1 | 1/2002 | Ogier et al. | |
| 2002/0093967 A1 | 7/2002 | Perlman et al. | |
| 2003/0074441 A1 | 4/2003 | Penk et al. | |
| 2003/0179742 A1 | 9/2003 | Ogier et al. | |
| 2005/0063317 A1 | 3/2005 | Risberg et al. | |
| 2006/0036755 A1 | 2/2006 | Abdullah et al. | |
| 2006/0259542 A1 * | 11/2006 | Wu et al. | 709/202 |
| 2007/0112969 A1 * | 5/2007 | Wang et al. | 709/230 |

FOREIGN PATENT DOCUMENTS

WO    WO2007005131 A2    1/2007

OTHER PUBLICATIONS

Gopalratnam, et al., "Automatically Extracting Fields from Unknown Network Protocols", available at least as early as Apr. 17, 2007, at <<http://research.microsoft.com/~sumitb/papers/SysML_114_cameraready.pdf>>, pp. 1-5.

Kannan, et al., "Automatic Protocol Description Generation from Network Traces", retrieved on Apr. 18, 2007, at <<http://www.cs.berkeley.edu/~kjk/protocol_semantics.shtml>>, pp. 1.

(Continued)

Primary Examiner—John B. Walsh
(74) Attorney, Agent, or Firm—Lee & Hayes, PLLC (57) ABSTRACT

A system for automatic inference of message formats from network packets is described. Each network message from a set of network messages is split into one or more tokens based on the types of bytes in the network messages. The set of network messages can then be classified into clusters based on token patterns. The network messages in each cluster can then be further sub-clustered recursively based on the message formats. Further, the messages with a similar message format across the sub-clusters can be merged into a cluster. The set of formatted clusters thus obtained correspond to a set of message formats that can be used further for protocol reverse engineering.

20 Claims, 7 Drawing Sheets

OTHER PUBLICATIONS

Ma, et al., Automatic Protocol Inference: Unexpected Means of Identifying Protocols, available at least as early as Apr. 17, 2007, at <<http://www.cse.ucsd.edu/Dienst/Repository/2.0/Body/ncstrl.ucsd_cse/CS2006-0850/postscript>>, pp. 1-14.

Singh, et al., "Reconstruction of Application Layer Message Sequences By Network Monitoring", available at least as early as Apr. 17, 2007, at <<http://www2.cs.uh.edu/~jaspal/papers/02ccn.pdf>>, pp. 1-6.

* cited by examiner

AUTOMATIC REVERSE ENGINEERING OF MESSAGE FORMATS FROM NETWORK TRACES

BACKGROUND

Due to the widespread development of new protocols, the knowledge of application level protocols is becoming important for network security reasons. However, many of the applications being developed are closed-source, of which little or no information is available about the protocols used by the applications. Message format reverse engineering, particularly as part of protocol reverse engineering, can be used in such a scenario, to deduce the description of protocols used by the applications.

One of the uses of protocol description generated from protocol reverse engineering is in penetration testing of network applications. Penetration testing involves generating test inputs for applications and observing their behavior to identify attacks or bugs. Such testing is highly inefficient when test inputs are generated randomly. Instead, protocol knowledge allows the generation of inputs that explore the program's operations more thoroughly. Protocol description also aids in protocol fingerprinting, which aims to identify the protocol that a particular connection belongs to by content analysis. It also aids in encapsulation detection, where the goal is to identify when one protocol (e.g., P2P) is encapsulated over another (e.g., HTTP). Another use of protocol description is in building protocol analyzers that help make deep packet inspection more practical and usable.

Protocol reverse engineering includes two main steps: message format inference and protocol state machine inference. Generally, existing tools that implement protocol reverse engineering need painstaking manual analysis of network traces for message format inference. Even automatic protocol analysis tools rely mostly on bio-informatics techniques for message format inference. These techniques employ sequence alignment for aligning messages, which looks for exact byte matches and is thus suited for aligning messages with similar byte sequences rather than with similar formats.

SUMMARY

This summary is provided to introduce simplified concepts of automatically inferring message formats from network packets, which is further described below in the Detailed Description. This summary is not intended to identify essential features of the claimed subject matter, nor is it intended for use in determining the scope of the claimed subject matter.

Implementations of automatic inference of message formats from network packets are described. In one implementation, each network message from a set of network messages is split into one or more tokens based on the types of bytes in the network messages. The set of network messages can then be classified into clusters of messages based on the token pattern of the messages. Each cluster can then be further sub-clustered recursively based on the message formats, which can be inferred from the messages in the cluster. The messages with a similar message format across sub-clusters can then be merged into another cluster. The set of clusters thus obtained after the recursive clustering and merging provide a set of message formats for protocol inference.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to techniques for implementing message format inference for protocol reverse engineering. More particularly, the techniques involve deducing message formats from traces of network packets.

The described systems and methods relate to inference of message formats from network traces made up of network packets. Network packets can first be assembled into network messages. Each network message can then be split into one or more tokens based on the types of bytes in the network messages. A token pattern can be inferred for each network message, which includes source-destination information and classes of tokens in the given network message. The network messages can be classified into clusters based on a comparison of the token patterns. Next, token types for the tokens in the messages in each cluster can be inferred to determine the message formats. Each cluster can then be further sub-clustered recursively based on the message formats. Finally, the network messages with similar message formats across sub-clusters can be merged into a cluster. The set of clusters thus obtained after the recursive clustering and merging provide a set of automatically inferred message formats for protocol inference.

Multiple and varied implementations and embodiments are described below. In the following section, an exemplary environment that is suitable for practicing various implementations is described. After this discussion, representative implementations of systems, devices, and processes for implementing automatic reverse engineering of message formats are described.

Exemplary Computing Environment

Figure 1:
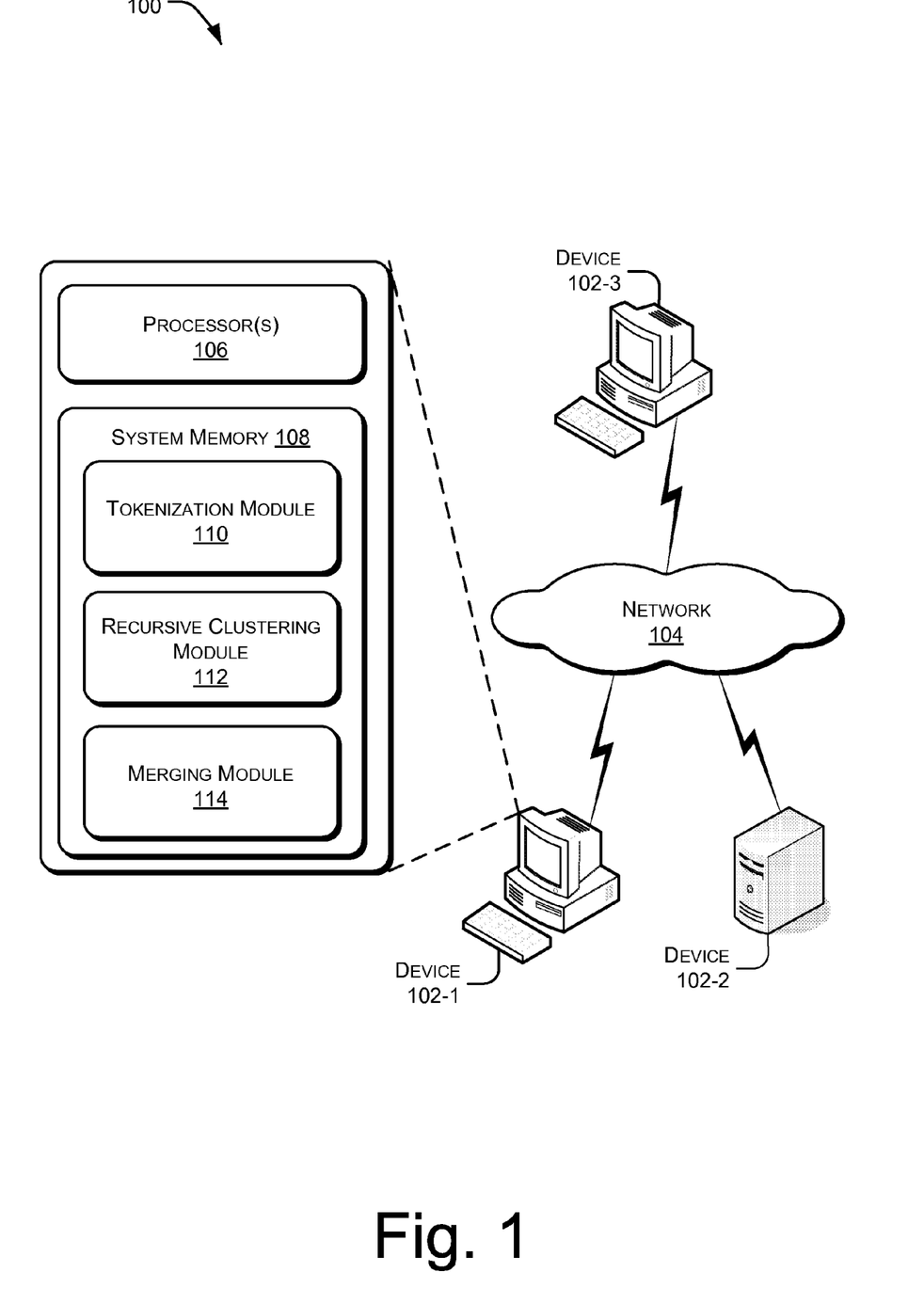
FIG. 1 illustrates an exemplary system architecture implementing automatic inference of message formats from network packets.

FIG. 1 shows an exemplary environment 100 that is suitable for implementing automatic reverse engineering of message formats from network traces. For discussion purposes, environment 100 may be a system that includes one or more devices 102-1, 102-2 . . . 102-n, collectively referred to as 102 hereafter, communicatively linked to each other through a network 104.

The device 102 can be implemented as a variety of conventional computing devices, including, for example, a server, a desktop PC, a notebook or portable computer, a workstation, a mainframe computer, a mobile computing device, an Internet appliance, a network router, etc. or a combination thereof that are configurable to receive and process network packets from the network 104.

The network 104 can be a wireless or a wired network, or a combination thereof. The network 104 can be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof.

In one embodiment, the device 102 includes a processor 106 coupled to a memory 108. The memory 108 includes a tokenization module 110, a recursive clustering module 112 and a merging module 114. The memory may be coupled to, associated with, and/or accessible to other devices, such as network servers, router, and/or other computing devices 102. When a source computing device sends information to a destination computing device over the network 104, the information is sent in the form of messages. The network 104 breaks the messages into packets or blocks of data for transmission. The devices 102 receive the transmission in the form of network traces or sequences of the network packets.

The tokenization module 110 can receive such packets from the network 104 and can reassemble the packets into network messages. The tokenization module 10 can then break the reassembled network messages into a sequence of tokens, where a token is a sequence of consecutive bytes that may belong to the same token class. A token class here may refer to types of bytes in the message e.g. text, binary.

A text token can be identified by comparing the text bytes with ASCII values of printable characters, and then considering a sequence of text bytes sandwiched between two delimiters as the text token. The delimiters that can be considered are the white space characters such as space, tab and binary bytes. Unicode encodings in the message can also be considered. Further, a verification condition, such as the existence of minimum 3 letters in a sequence, may be used to decide that the token is a text token. A binary token can be identified by locating bytes which are not in the range of printable characters, i.e., bytes that are binary bytes. In such a case, a single binary byte is identified to be a binary token.

The tokenization module 110 then identifies a token pattern for each of the messages using the direction of the message and the token class of each token of the message. The direction of the message gives the source destination information such as "client to server". The token pattern of a message can be, for example, "client to server, text, text, binary". The tokenization module 110 can classify the messages into various clusters based on a comparison of the token patterns.

The recursive clustering module 112 can infer token types for the messages in each cluster and then cluster the messages into sub-clusters based on the inferred token types and message formats. The token types can include token properties and token semantics. Token properties can be associated with a set of properties that reveal the nature of the token. For example, one property can classify tokens as text and binary, while, another property can classify tokens as constant and variable. Token semantics can be associated with general semantics such as length, offset, cookie, end-point addresses, and end-point names. Message formats specify the sequence of tokens based on the token types.

The recursive clustering module 112 uses the inferred token types and message formats to identify format distinguisher tokens in each cluster. Values of the format distinguisher token can be used to distinguish messages with different message formats that have the same token pattern. The value of the format distinguisher token can, for example, be based on context-sensitive nature in the grammar of application-level protocols. For example, SMTP commands may have two text tokens, e.g. "MAIL receiver," "RCPT sender," HELO server-name" and so forth. These commands have a similar token pattern, but different message formats. Based on the values of the format distinguisher tokens, such as MAIL, RCPT and HELO, the recursive clustering module 112 can sub-cluster the messages into sets of messages with same formats.

The merging module 114 can merge network messages in different sub-clusters having similar message formats based on the token types. The similar message formats can be redundant message formats that are distributed across clusters. The similar message formats may be formed, for example, as a result of over-classification in tokenization and recursive clustering.

Thus, the set of network messages can be organized into various formatted clusters, each of which corresponds to different inferred message formats. Exemplary working of the client device 102 and the various modules in the system memory 108 are now described in detail with reference to FIG. 2.

Figure 2:
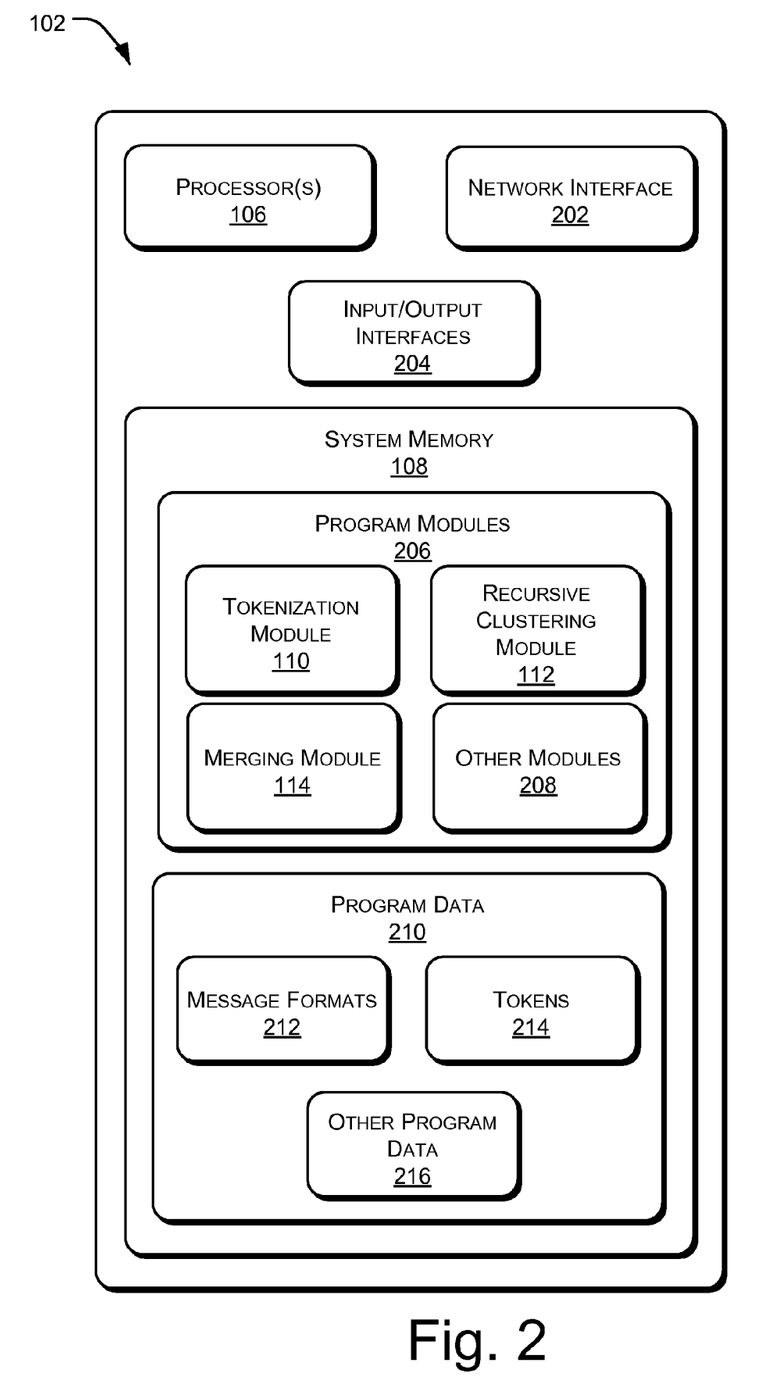
FIG. 2 illustrates an exemplary computing device for automatic inference of message formats from network packets.

FIG. 2 illustrates various components of an exemplary computing device 102. In one embodiment, the computing device 102 can include, but is not limited to, a processor 106, a network interface 202, a system memory 108, and an Input/Output Interface 204.

The network interface 202 may enable the computing device 102 to send and receive packets from the network 104. For example, the network interface 202 may be used by the computing device 102 to receive network packets from one or more computing devices over the network 104.

The memory 108 includes computer-readable media in the form of volatile memory, such as Random Access Memory (RAM) and/or non-volatile memory, such as Read Only Memory (ROM) or flash RAM. The memory 108 typically includes data and/or program modules for implementing message format inference that are immediately accessible to and/or presently operated on by processor 106. In one embodiment, the memory 108 includes a tokenization module 110, a recursive clustering module 112 and a merging module 114. The other modules 208 may include other software that assists in the functioning of the client device 102, such as the Operating Systems. The program data 210 may include message formats 212, tokens 214 and other data 216 specific to the system or the applications.

In one implementation, the tokenization module 110 can receive packets from the network 104 and can reassemble the packets into messages. The reassembled messages can then be converted into tokens of different classes, such as text tokens and binary tokens, based on the types of bytes, such as binary bytes and text bytes. A token pattern can then be formed by using the direction of message and the token class of every token of the message. The token patterns can be compared for all network messages and then the network messages can be classified based on the comparison, into one or more clusters. For example, all network messages having the token pattern "client to server, text, binary, text" can be classified into the same cluster.

The recursive clustering module 112 can infer a message format 212 for each cluster of network messages by inferring the token types of the messages in the cluster The message format 212 of a cluster specifies a sequence of token types to capture the contents of all the network messages in the cluster. The token types can include token properties and token semantics.

The token properties can be associated with a set of properties that reveal the nature of the token. For example, one property can classify tokens as text and binary, while, another property can classify tokens as constant and variable. The constant tokens can be those tokens that take the same value across the set of messages. The variable tokens can be those tokens which take more than one value across the set of messages.

The token semantics can be associated with general semantics such as length, offset and cookie, end-point addresses, end-point names. The length token can specify the length of the network message or a subsequent variable length token. The cookie token can help in inferring message formats for messages in the same session. The end-point addresses token can help in inferring message formats for tokens that have encoded IP addresses. The end-point names can help in inferring message formats for tokens that have encoded host names. The offset token can help in determining the offset of another token starting from another token offset.

The recursive clustering module 112 thus infers the message format for a set of network messages in a cluster by inferring the token properties and the token semantics of the messages in the cluster after the tokenization module 110 has generated the clusters based on the token patterns. For this, the recursive clustering module 112 compares the tokens in one message against their counterparts in another message in the same cluster by using the token offset.

For example, the recursive clustering module 112 uses the length semantic tokens for a specific pair of network messages to reflect the difference in the value of a length token, as, the difference of the size of the network message or some subsequent variable length token. If a match between the value difference and the size difference holds true for all the network messages in the cluster, such token can be declared as a length token.

The recursive clustering module 112 then identifies format distinguisher tokens in the set of messages in a cluster to split the cluster into sub-clusters. For this, each cluster can be scanned token wise from left to right for identifying a token that can be used to distinguish between different message formats. The value of the format distinguisher token can be used to decide the format of the rest of the network message. The identified format distinguisher token can then be used to sub-cluster the cluster of messages.

In one implementation, after the format distinguisher token is identified, the cluster is broken down into multiple sub-clusters. The sub-clusters can then be compared with each other based on the message formats. While comparing two message formats, the two network message formats can be scanned token-by-token from left-to-right and then the inferred properties such as text/binary, constant/variable, and semantic are matched for the two message formats. If all tokens for both the network message formats match, then these network message formats can be considered to be the same. A constant token can also be allowed to match with a variable token if the variable token takes the value of the constant token at least once. A variable token can also be allowed to match with another variable token if the set of values taken by one has an overlap with those taken by another.

The recursive clustering module 112 compares the sub-clusters so formed to determine whether the sub-clusters have the same message formats 212. If the sub-clusters correspond to different message formats, the splitting obtained using the identified format distinguisher token can be retained. The recursive clustering module 112 can then recursively operate on each of the sub-clusters, scanning further down the messages and identifying additional format distinguisher tokens. However, if the sub-clusters correspond to similar message formats, the splitting can be undone.

The merging module 114 can merge network messages present in different clusters having similar message formats into a single cluster. The similar message formats are redundant message formats that are distributed across clusters and are a result of over-classification in tokenization and recursive clustering. For example, a single text token "File Name" can be incorrectly interpreted as two text tokens "File" and "Name", which may lead to wrong token patterns and can cause the messages having the tokens corresponding to the text "FileName" and "File Name" to go to different clusters. Since, the above evaluated message formats differ only in one token, they are similar message formats, and can be merged by the merging module 114.

In one implementation, the merging module 114 can use type-based alignment for comparing and merging similar message formats. The type-based alignment can be used to compare message formats and merge them based on the comparison. For example, the merging module 114 can align tokens with gaps. In such an instance, consecutive binary tokens in one message format are allowed to align with gaps if they precede or follow a text token in the other message format in the alignment. Additionally, the number of binary tokens is limited to being at most the size of the text token if the text token is aligned with a gap, or the size difference if the text token is aligned with another text token. This constraint is for handling the case of mistaking a sequence of binary tokens to be a text token or vice-versa. Second, a text token is allowed to align with a gap, but at most two gaps of this kind are allowed. This constraint is for handling the case in which a text field, including some white space characters, is mistakenly divided into multiple tokens.

Before aligning and comparing two message formats to decide whether to merge them, the gap constraint is checked. If the gap constraint is not satisfied the two message formats are not aligned. If the gap constraint is satisfied and the number of mismatches is not greater than one, the two message formats are matched and merged.

The merging module 114 can align message formats such that each merged cluster can have network messages with similar message formats 212. The merging module 114 then infers the message formats 212 corresponding to the merged clusters from the set of messages in each merged cluster in a manner similar to that used by the recursive clustering module 112.

Figure 3:
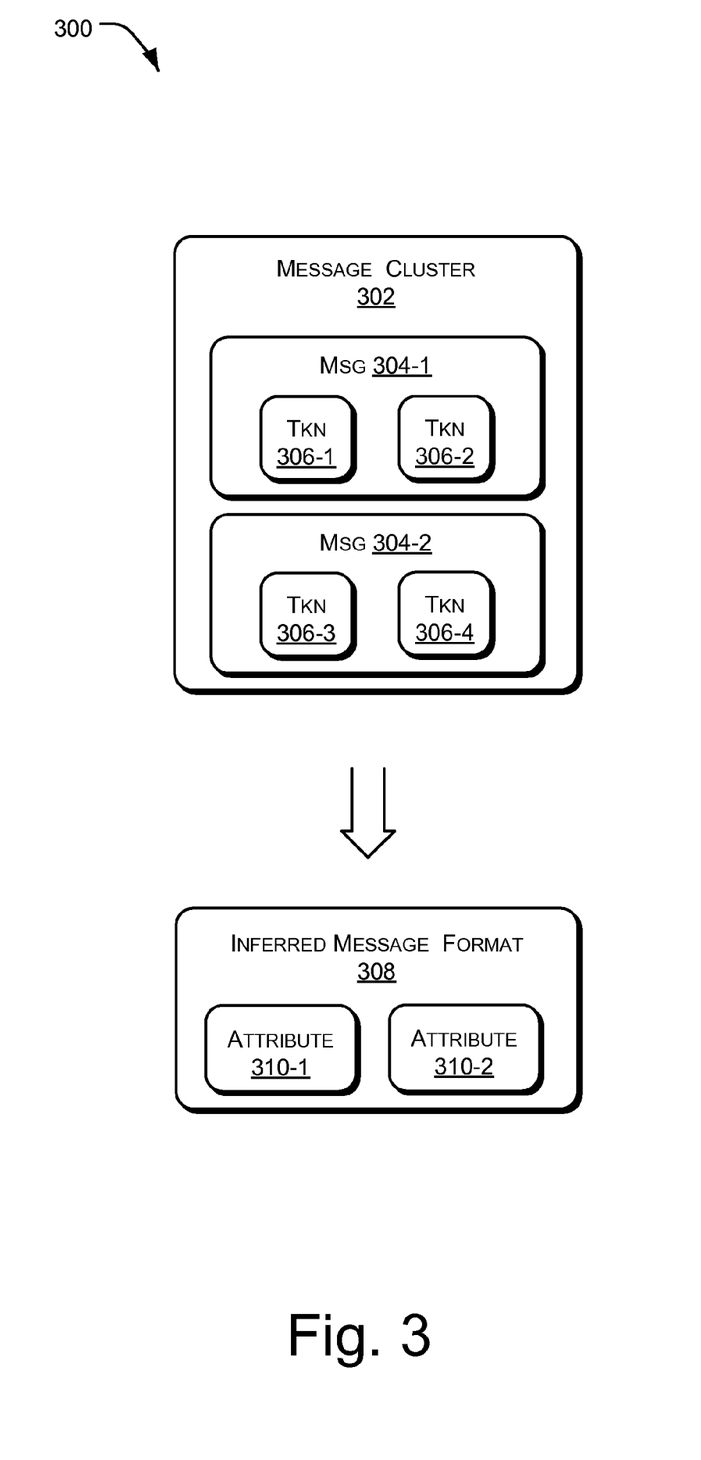
FIG. 3 illustrates the inference of message formats from message clusters.

FIG. 3 illustrates the inference of message formats from message clusters. The message cluster 302 includes one or more messages 304-1, 304-2 . . . 304-n, also collectively referred to as 304. The messages 304 include one or more tokens 306-1, 306-2 . . . 306-n, also collectively referred to as 306. The inferred message format 308 includes one or more token types 310-1, 310-2 . . . 310-n, also collectively referred to as 310.

In one implementation the tokenization module 110 can break a network message 304 into one or more tokens 306. Each token 306 can be associated with token properties and token semantics. The recursive clustering module 112 can infer the token properties and token semantics for a set of messages to form inferred message formats 308. In one implementation, the message cluster 302 includes the network messages 304-1 and 304-2. All of the messages in the cluster 302 can have the same token pattern. For example, both messages 304-1 and 304-2 can have the token pattern "client to server, text, binary, text". The recursive clustering module 112 can then infer token properties and token semantics for the set of messages 304 in the message cluster 302. The inferred token properties and token semantics referred to as token types 310 can be used to infer the message format 308 for the set of messages 304.

For example, the network messages 304-1 and 304-2 can be broken down into tokens 306-1, 306-2, 306-3, 306-4 by the tokenization module 110. Both the messages 304-1 and 304-2 can have the same token pattern and thus can be clustered into one message cluster 302. The recursive clustering module 112 can infer a message format 308 for both the network messages 304-1 and 304-2 based on the token properties and token semantics of the tokens 306 of each message. This message format 308 can correspond to a sequence of token types 310 that is determined based on the inferred token properties and the token semantics. The token types 310-1 and 310-2 can be token properties such as constant/variable or text/binary and token semantics such as length token, cookie token, and so forth.

Figure 4:
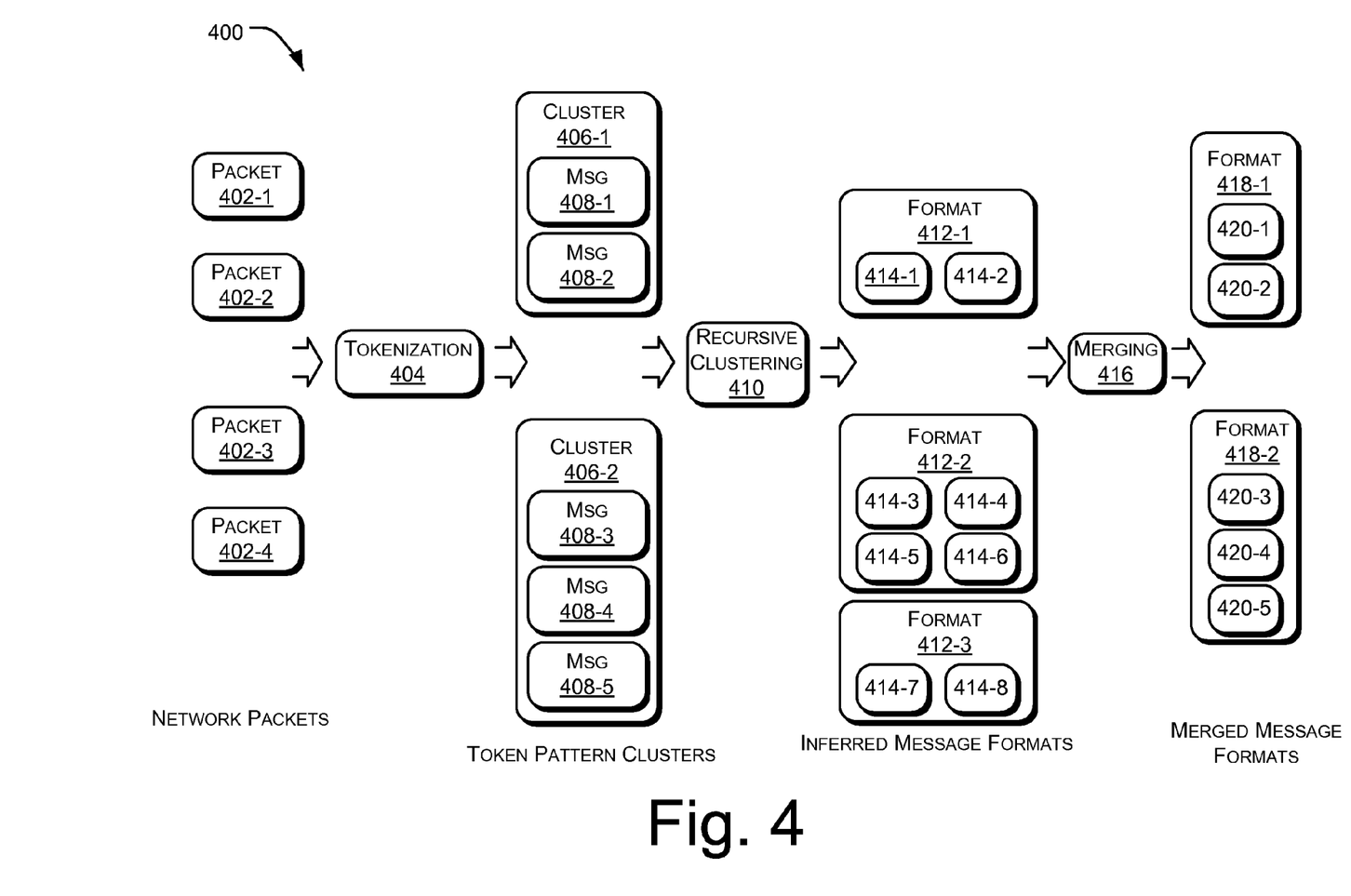
FIG. 4 illustrates the implementation of message format inference from network packets on a network.

FIG. 4 illustrates an exemplary implementation of automatic reverse engineering of message formats from network packets. One or more network packets 402-1, 402-2 . . . 402-n, collectively referred to as 402 hereinafter, received from the network 104 can undergo a tokenization process 404. The tokenization module 110 described above performs the tokenization process 404. The tokenization process 404 can generate one or more network messages 408-1, 408-2 . . . 408-n, collectively referred to as 408, from the network packets 402. The tokenization process 404 can generate one or more tokens for each of the network messages 408 based on the types of bytes such as text bytes and binary bytes. A token pattern can be identified for each of the messages using the direction of the message and the token class of each token of the message. Each network message 408 can then be clustered into one or more clusters 406-1, 406-2 . . . 406-3, collectively referred to as 406, based on a comparison of the token patterns. Each cluster 406 thus formed includes a set of network messages 408 having the same token pattern.

A recursive clustering process 410 can take a set of messages in a cluster 406 as input and infer a message format for the set of messages. The recursive clustering module 112 described above performs the recursive clustering process 410. The message format is inferred based on the token properties and token semantics of each token in the message 408. Each of the one or more inferred message formats 412-1, 412-2 . . . 412-n, collectively referred to as 412 can have one or more token types 414-1, 414-2 . . . 414-n, collectively referred to as 414. Thus, the set of network messages in a cluster 406 has the same inferred message format. For example, the message format for 412-1 can be a constant token followed by a cookie token. In another example, the message format 412-2 can be inferred from the set of network messages in a single cluster as having the four token types 414-3, 414-4, 414-5, and 414-6.

A merging process 416 can take the message formats 412 from across the clusters as input and compare them based on the similarity of the message formats 412. The merging module 114 described above performs the merging process 416. The merging process 416 can use type-base sequence alignment for format comparison in which, message formats from across the clusters are compared with each other and similar message formats are merged on the basis of the comparison. Each of the merged message formats 418-1, 418-2 . . . 418-n, collectively referred to as 418, can have one or more token types 420-1, 420-2 . . . 420-n, collectively referred to as 420 that include the token properties and the token semantics.

The message formats 418 inferred as a part of the merging process 416 can have a one-to-one mapping with the merged clusters. In one implementation, the merging process 416 causes two or more message formats, and thereby clusters, to merge into a single message format or cluster. In another implementation, the merging process 416 may retain a message format without merging the message format with any other message format if no similar message format is found.

Formatted clusters can finally be formed using the merged clusters and the retained clusters. A final set of message formats can then be inferred from the formatted clusters. For example, during the merging process 416, if three clusters out of five clusters have similar message formats, the three clusters can be merged into one cluster thus resulting in three formatted clusters, which includes two retained clusters and one merged cluster. The final set of message formats can then be inferred from the formatted clusters.

Exemplary Methods

Exemplary methods for implementing automatic reverse engineering of message formats are described with reference to FIGS. 1-4. These exemplary methods may be described in the general context of computer executable instructions. Generally, computer executable instructions can include routines, programs objects, components, data structures, procedures, modules, functions, and the like that perform particular functions or implement particular abstract data types. The methods may also be practiced in a distributed computing environment where functions are performed by remote processing devices that are linked through a communication network. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein. In the context of software, the blocks represent computer instructions that, when executed by one or more processors, perform the recited operations.

Figure 5:
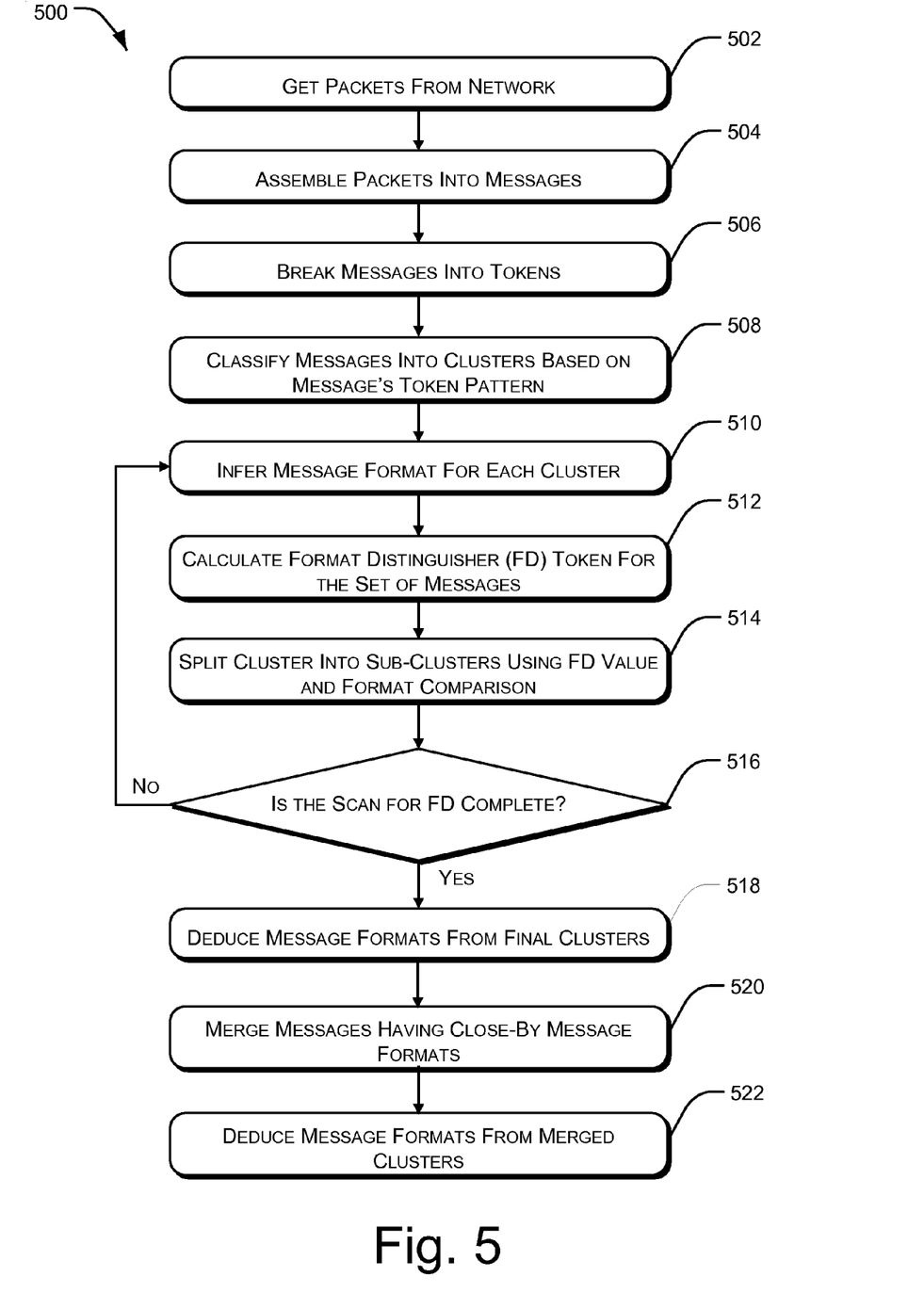
FIG. 5 illustrates exemplary method(s) for inference of message formats from network packets.

FIG. 5 illustrates an exemplary method 500 for implementing inference of message formats from network packets on a computing device 102.

At block 502, the packets 402 that carry information from a source computing device to a destination computing device are received from the network 104. The information sent over the network 104 from the source computing device to the destination computing device can be in the form of network messages 408. At block 504, the packets 402 from the network 104 can be reassembled into network messages 408.

At block 506, the network messages 408 can be broken down into tokens 306 based on token class. The token class can be based on the types of bytes in the network message. For example, the type of bytes can be text, binary. Thus, block 506 can generate a sequence of tokens for each network message 408 based on the type of bytes.

At block 508, the network messages 408 can be classified into clusters 406 based on token patterns. A cluster 406 can be a group of messages having the same token pattern. The token pattern for each network message 408 can include source-destination information and a sequence of token classes. For example, a network message 408 can have the token pattern "client to server, text, binary, text." The network messages 408 can be clustered based on the similarity of the token patterns.

At block 510, a message format 308 can be inferred for a set of network messages 408 in a cluster 406. The message format 308 can be based on the token properties and the token semantics of the set of network messages 408. The inferred message format 308 can be a sequence of token types, which includes token properties and token semantics. The inferred message formats 308 can be inferred by a comparison of the token properties and token semantics between the network messages 408 in a cluster 406. For example, the inferred message format 308 for the set of network messages 408 can be a cookie token followed by a length token.

At block 512, a format distinguisher token can be identified for the set of messages in the cluster 406. The format distinguisher token can be identified by scanning the set of messages 408 in a cluster 406 token by token from left to right. The format distinguisher token distinguishes the set of messages in a cluster 406 based on the message format. The calculation of the format distinguisher token is explained in detail with reference to FIG. 6.

At block 514, the cluster 406 can be broken down into sub-clusters based on the identified format distinguisher token and a format comparison as follows. Once the format distinguisher token is found at block 512, the format distinguisher token is used to split cluster 406 into sub-clusters such that each sub-cluster has the network messages with the same format distinguisher token value. Each sub-cluster so formed can be compared with one another to see whether the message formats 308 for the sub-clusters are the same.

If the sub-clusters have the same message format, the splitting is undone and the calculation for the format distinguisher token is continued in the current cluster 406. However, if the sub-clusters do not have the same message format, it is inferred that the splitting of the current cluster 406 into sub-clusters can be retained and the scanning for format distinguisher token can be continued for the set of messages in each of the sub-clusters. Thus, after the splitting, the sub-clusters that are formed are treated as clusters for further splitting.

At block 516, it can be checked whether the scan for the format distinguisher token on the set of messages in the cluster 406 has been completed. If the scan for the format distinguisher token on the set of messages is not complete, the scan can be continued until the next format distinguisher token is found. If the scan for the format distinguisher token on the set of messages in a cluster 406 is complete, but the scan for all the other existing clusters is not complete, the message formats are inferred for each cluster and the scan for format distinguisher token is continued recursively. Each sub-cluster formed after the completion of one cycle of the scan can be considered as a cluster for the next recursive step. If the scan for the format distinguisher token is complete for all clusters, then the message formats are inferred from the set of final clusters at block 518. The set of final clusters includes the clusters which are a result of the recursive clustering performed by the recursive clustering module 112.

For example, in one implementation, cluster 1 and cluster 2 can be recursively clustered using the recursive clustering module 112. The message format can be inferred for cluster 1 and format distinguisher token is identified for the set of messages in the cluster 1. The cluster 1 can then be split into sub-clusters such as sub-cluster 11 and sub-cluster 12 based on the format distinguisher token. If sub-cluster 11 and sub-cluster 12 have different message formats, the splitting is retained. However, if sub-cluster 11 and sub-cluster 12 have the same message format, the splitting is undone and the scan for format distinguisher token is repeated on the same set of messages until the next format distinguisher token is found. Sub-clusters such as sub-cluster 11 and sub-cluster 12 can be considered to be clusters in the next recursive clustering phase. Once the scan for the format distinguisher token is over for cluster 1 and its further sub-clusters cluster 2 can be considered for the recursive clustering phase.

At block 518, the message formats can then be inferred from the set of final clusters. These message formats can then be used for aligning network messages across clusters by the merging module 114.

At block 520, the messages can be merged based on a determination of similar message formats. The similar message formats are redundant message formats which may be spread across clusters. The similar message formats may be a result of over-classification by the tokenization module 110 and recursive clustering module 112. Type-based sequence alignment can be used to align message formats and identify similar message formats. For example, type-based sequence alignment can compare message formats by using the Needleman-Wunsch algorithm to compute a distance based on the comparison of aligned token types and gaps.

At block 522, we can infer message formats for the set of messages in each merged cluster.

Figure 6:
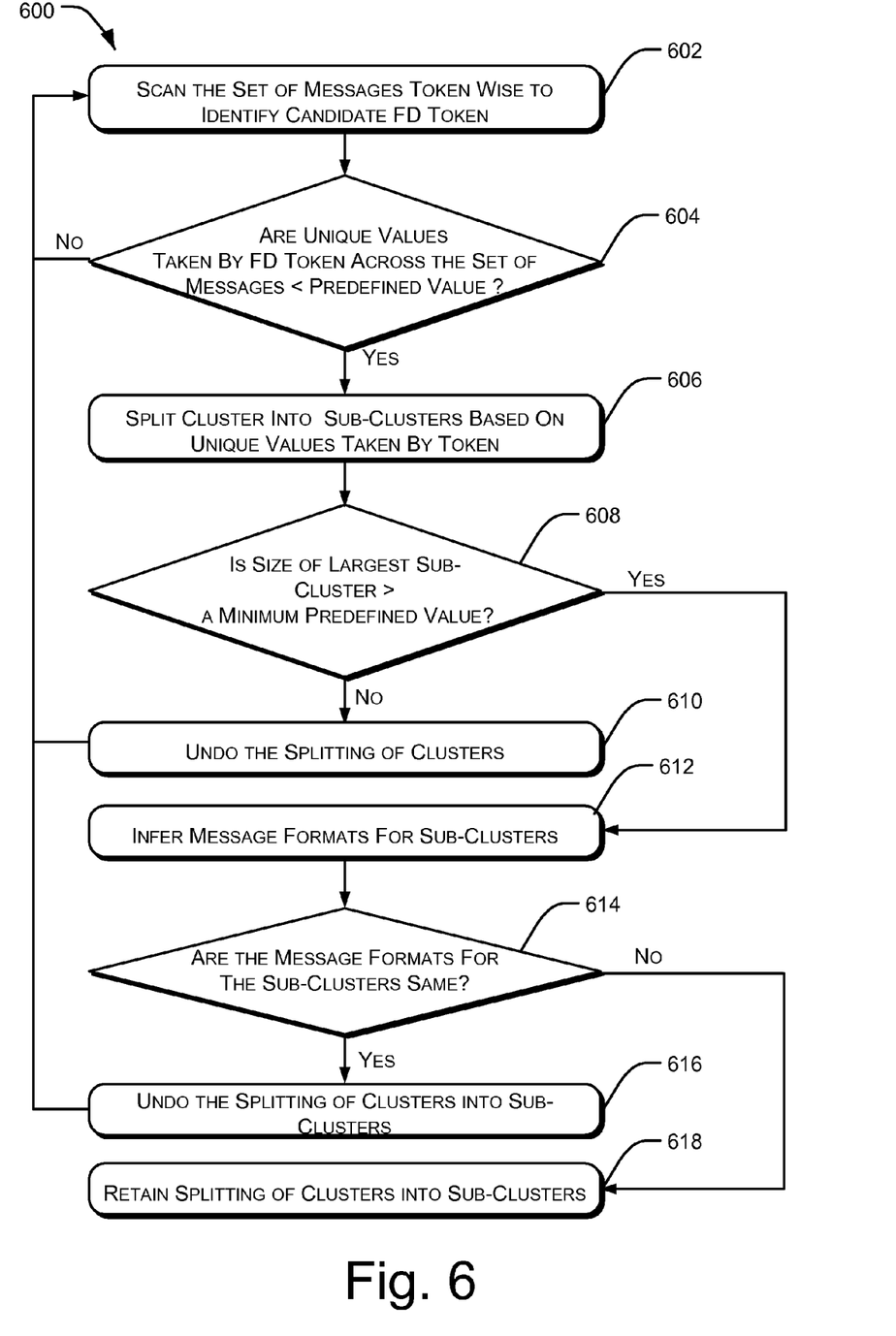
FIG. 6 illustrates exemplary method(s) for finding a format distinguisher token.

FIG. 6 illustrates an exemplary method 600 for evaluating a format distinguisher token. In an exemplary implementation, the recursive clustering module 112 evaluates the format distinguisher token as described below.

At block 602, a set of messages from a cluster 406 can be scanned token-wise from left to right to identify a candidate format distinguisher token. The format distinguisher token can be a token that takes different values across different message formats that have similar token patterns.

At block 604, it is determined whether the number of unique values taken by the candidate format distinguisher token across the set of network messages in the cluster is less than a predefined value. The predefined value can be manually set. If the number of unique values taken by the candidate format distinguisher token is more than the predefined value, the scan for a format distinguisher token can be continued on the same set of messages in the cluster 406 at block 602. If the number of unique values is less than the predefined value, the process 600 moves to block 606.

At block 606, the cluster 406 is broken down into multiple sub-clusters one for each of the unique values taken by the candidate format distinguisher token. Each sub-cluster includes the network messages in which the candidate format distinguisher token takes a specific value.

At block 608, it is checked whether the size of the largest sub-cluster formed by the splitting at block 606 is greater than a predefined value. If the size of the largest sub-cluster is less than the predefined value, the splitting is undone at block 610 and the scan for the format distinguisher token can be continued on the same cluster 406 at block 602. This check at block 608 can be used to ensure that meaningful format inference is made in at least one sub-cluster. If the size of the largest sub-cluster is greater than the pre-defined value, the process 600 moves to block 612.

At block 612, message formats are inferred for the set of network messages in each sub-cluster. Each inferred message format can be based on token properties and token semantics of the set of network messages.

At block 614, a comparison is made to check if the sub-clusters have the same message format.

At block 616, if the sub-clusters have the same message format, the splitting done at block 606 is undone.

At block 618, if the sub-clusters do not have the same message format, it is inferred that the splitting of the current cluster 406 into sub-clusters can be retained and the scanning for at least one additional format distinguisher token can be continued for the set of messages in each of the sub-cluster. Thus, after the splitting, the sub-clusters that are formed are further processed to determine whether additional format distinguisher tokens exist. The previous cluster, e.g., 406, is not processed further.

Figure 7:
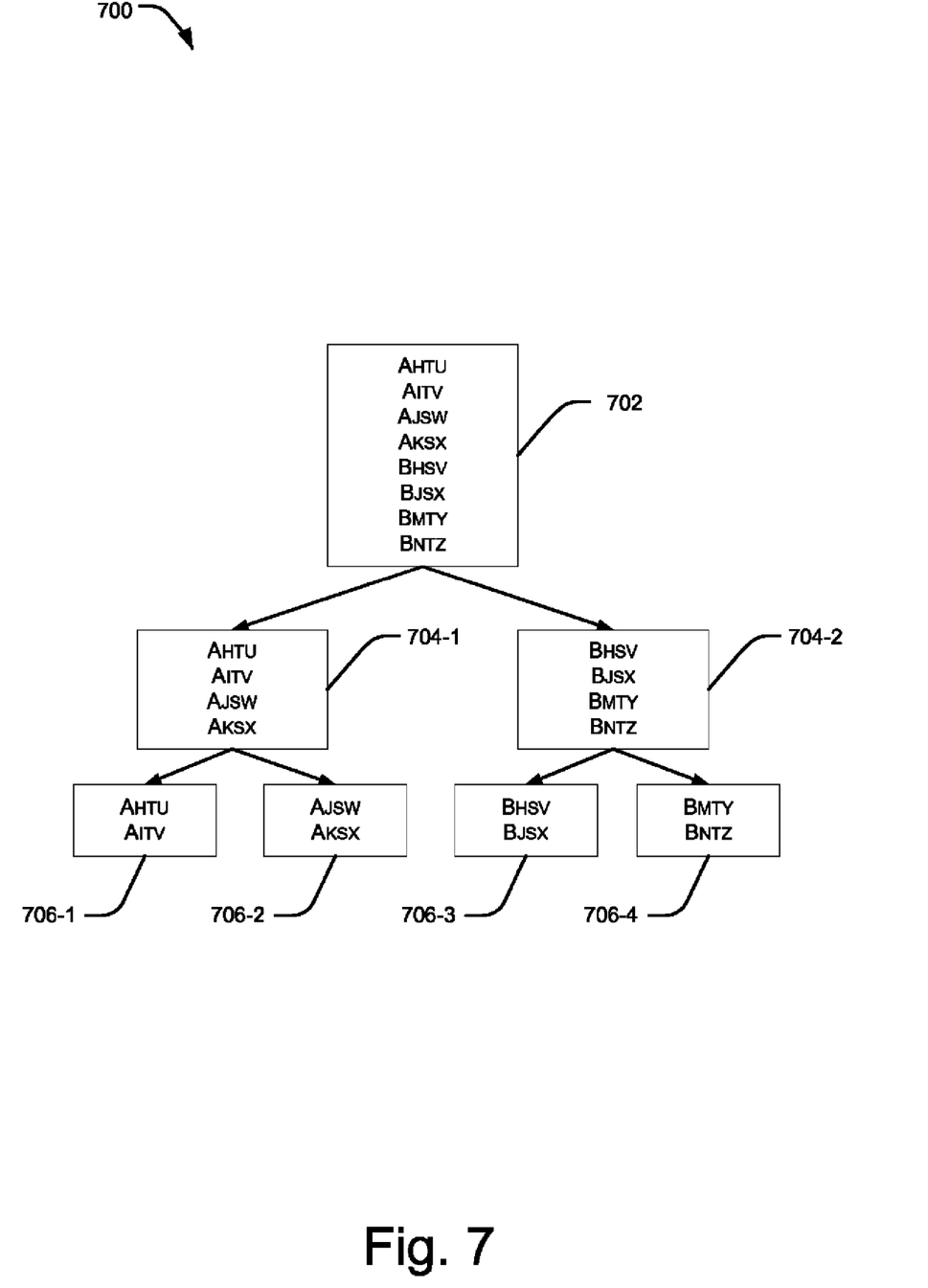
FIG. 7 illustrates an exemplary implementation for identifying the format distinguisher token and splitting the clusters based on the found token.

FIG. 7 illustrates an exemplary implementation 700 for identifying the format distinguisher token and splitting the clusters based on the format distinguisher token. The FIG. 7 includes a top level cluster 702, middle level clusters 704-1, 704-2, collectively referred to as 704 hereinafter, and bottom level clusters 706-1, 706-2, 706-3, 706-4, collectively referred to as 706 hereinafter.

The top level cluster 702 includes a set of network messages that have been broken down into tokens based on the token class. For example, the network message AJSW has four tokens associated with it. A format distinguisher token can be identified by scanning the tokens from left to right for the set of messages. For example, the first token in the cluster 702 can be identified as a format distinguisher token having two unique values A and B, using which the cluster 702 can be split into the middle level clusters 704.

The middle level clusters 704 include the multiple sub-clusters generated using the format distinguisher token identified in the top level clusters 702. These middle level clusters 704 can again be scanned by the recursive clustering module 112 to identify the format distinguisher token for each sub-cluster if the number of unique values taken by the token is less than a predefined threshold. For example, if the second token value in sub-cluster 704-1 is considered as a candidate format distinguisher token and the predefined threshold value is three, then the number of unique values taken across the set of messages in sub-cluster 704-1 is four and thus does not satisfy the criterion of block 604. So, the scan proceeds to the third token value. If the third token in the sub-cluster 704-1 is considered as the candidate format distinguisher token, the number of unique values taken across the set of messages in sub-cluster 704-1 is two, which satisfies the criterion of block 604. The sub-cluster 704-1 can then be further sub-clustered into the bottom level clusters 706-1 and 706-2 using the format distinguisher token values T and S.

The bottom level sub-clusters 706 include the network messages having similar message formats. The message formats for each cluster can be inferred by the recursive clustering module 112 and/or the merging module 114 as explained earlier.

CONCLUSION

Although the invention has been described in language specific to structural features and/or methodological acts for implementing automatic message format inference from network traces, it is to be understood that the invention is not necessarily limited to the specific features or acts described. Rather, the specific features and acts are disclosed as exemplary forms of implementing the invention.

What is claimed is:

1. A method for inferring message formats comprising:
a computing device splitting each message of a set of network messages into one or more tokens, wherein the splitting is based on identifying types of bytes in the message;
creating one or more clusters of messages from the set of network messages based on token patterns, wherein a token pattern of a given message includes a direction value and classes of the tokens in the given message;
recursively clustering the messages of a cluster into sub-clusters of messages based on a message format, wherein the message format is based on inferred types of the tokens in the given set of messages; and
inferring message formats from formatted clusters, wherein the formatted clusters are formed from the sub-clusters.

2. The method of claim 1, wherein the types of bytes include text bytes and binary bytes, and further wherein the classes of the tokens include text tokens and binary tokens.

3. The method of claim 1, wherein the types of the tokens include token properties and token semantics.

4. The method of claim 3, wherein the token properties include one or more of text, binary, constant, and variable, and further wherein the token semantics include one or more of length, offset, cookie, end point addresses, and end point names.

5. The method of claim 1, wherein the recursively clustering comprises:
evaluating a format distinguisher token in the given messages to identify the message format.

6. The method of claim 5, wherein the evaluating comprises
verifying whether a number of values taken by a token across the messages of a cluster is less than a predetermined value; and
grouping the messages of a cluster into a sub-cluster based on the values taken by the token if a size of the sub-cluster exceeds a predetermined threshold.

7. The method of claim 6, wherein the recursively clustering further comprises:
verifying whether the messages within the sub-cluster have the same message format; and
splitting the sub-cluster into one or more further clusters based on the verification.

8. The method of claim 1, further comprising merging the messages having similar message formats across the sub-clusters into merged clusters.

9. The method of claim 8, wherein the formatted clusters include one or more of the merged clusters and the sub-clusters.

10. The method of claim 8, wherein the merging comprises aligning a gap with a token based on the types of the token.

11. The method of claim 10, wherein a binary token is aligned with the gap if the binary token either precedes or follows a text token based on at least one constraint.

12. The method of claim 11, wherein the constraint is the number of binary tokens being limited to at most the size of the text token if the text token is aligned with a gap or the size difference if the text token is aligned with another text token.

13. The method of claim 11, wherein the constraint is a text token is allowed to align with a gap, with at most two gaps being allowed.

14. A computing-based device comprising:
a memory;
one or more processors operatively coupled to the memory;
a tokenization module configured to:
generate one or more tokens from each message of a set of network messages based on an identification of types of bytes in the message; wherein the types of bytes include text bytes and binary bytes; and
create one or more clusters of messages from the set of network messages based on token patterns, wherein a token pattern of a given message includes a direction value and classes of the tokens in the given message, wherein the classes of the tokens include text tokens and binary tokens; and a recursive clustering module configured to cluster the messages into sub-clusters of messages based on message formats, wherein the message formats are inferred from token properties and token semantics of the tokens in the messages.

15. The computing-based device of claim 14, wherein the recursive clustering module is further configured to evaluate a format distinguisher token in the given messages to identify the message format, wherein the format distinguisher token is evaluated based on at least one of a number of unique values taken by a token, a size of the sub-cluster, and a comparison of the message formats of each sub-cluster.

16. The computing-based device of claim 14, further comprising a merging module configured to:
   align the messages across the sub-clusters based on the token properties and the token semantics;
   merge the messages having similar message formats into merged clusters; and
   infer the message formats from formatted clusters, wherein the formatted clusters are formed from one or more of the merged clusters and the sub-clusters.

17. The computing-based device of claim 16, wherein the merging comprises aligning a gap with a token based on the types of the token.

18. A computer-readable medium having a set of computer readable instructions that, when executed, perform acts comprising:
   generating one or more tokens from each message of a set of network messages, wherein the generating is based on types of bytes in the message;
   dividing the set of network messages into one or more clusters based on token patterns, wherein a token pattern of a given message includes a direction value and classes of tokens in the given message;
   recursively clustering the messages of each cluster into sub-clusters of messages based on message formats, wherein the message formats are based on inferred types of the tokens in the messages; wherein the recursively clustering further comprises computing a format distinguisher token based on at least one of a number of unique values taken by a token, a size of a sub-cluster, and a comparison of the message formats of each sub-cluster;
   merging the messages with similar message formats into merged clusters; and
   inferring message formats from formatted clusters, wherein the formatted clusters are formed from one or more of the merged clusters and the sub-clusters.

19. The computer readable medium of claim 18, wherein the merging comprises aligning a gap with a token based on the types of the token, wherein a binary token is aligned with the gap if the binary token either precedes or follows a text token and wherein the number of binary tokens is limited to being at most the size of the text token if the text token is aligned with a gap or the size difference if the text token is aligned with another text token.

20. The computer-readable medium of claim 18, wherein the types of the tokens include one or more of a token property and token semantics, wherein the token property includes text, binary, constant, and variable tokens and wherein token semantics include length, offset, cookie, end point addresses, and end point names.

* * * * *